United States Patent
Liao et al.

(10) Patent No.: US 8,968,130 B2
(45) Date of Patent: Mar. 3, 2015

(54) BICYCLE COGSET WITH SUPPORT ELEMENT

(75) Inventors: Chia-Wei Liao, Taichung (TW); Chung-Yan Huang, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 658 days.

(21) Appl. No.: 13/069,737

(22) Filed: Mar. 23, 2011

(65) Prior Publication Data

US 2012/0244978 A1   Sep. 27, 2012

(51) Int. Cl.
*B62M 9/10* (2006.01)

(52) U.S. Cl.
CPC ....................... *B62M 9/10* (2013.01)
USPC .......................................................... 474/160

(58) Field of Classification Search
CPC ........... B62M 9/10; B62M 9/105; B62M 9/12
USPC ......................................................... 474/160
See application file for complete search history.

(56) References Cited

U.S. PATENT DOCUMENTS

| | | | | |
|---|---|---|---|---|
| 5,935,034 | A * | 8/1999 | Campagnolo | 474/160 |
| 7,131,656 | B2 * | 11/2006 | Valle | 280/260 |
| 7,344,463 | B2 * | 3/2008 | Reiter | 474/160 |
| 7,585,240 | B2 * | 9/2009 | Kamada | 474/160 |
| 7,871,347 | B2 * | 1/2011 | Kamada | 474/160 |
| 2004/0070166 | A1 * | 4/2004 | Valle | 280/260 |
| 2004/0121867 | A1 * | 6/2004 | Reiter | 474/160 |
| 2005/0272546 | A1 | 12/2005 | Reiter | 474/152 |
| 2006/0172840 | A1 * | 8/2006 | Kamada | 474/152 |
| 2009/0042679 | A1 * | 2/2009 | Valle | 474/152 |
| 2010/0099530 | A1 * | 4/2010 | Chiang et al. | 474/160 |

* cited by examiner

*Primary Examiner* — William A Rivera
*Assistant Examiner* — Michael Riegelman
(74) *Attorney, Agent, or Firm* — Alan D. Kamrath; Kamrath IP Lawfirm, P.A.

(57) ABSTRACT

A cogset, which is adapted to connect to a rotatable hub in a bicycle, includes a first cog, a second cog connected to the first cog, and a support element installed to the second cog. A limiting side of the support element is abutted against a side of the second cog. The support element is mounted by the first cog. Each of the first and second cogs is not directly connected to the rotatable hub.

16 Claims, 9 Drawing Sheets

BICYCLE COGSET WITH SUPPORT ELEMENT

BACKGROUND OF THE INVENTION

1. Field of the Invention

The present invention relates to a bicycle cogset with a support element whose components can be easily and securely installed to each other and, more particularly, the cogset with the support element has the advantage of being very lightweight.

2. Description of the Related Art

U.S. Publication No. 2005/0272546 shows a riveted sprocket assembly that includes a sprocket carrier having a plurality of carrier arms and a plurality of sprockets attached to the carrier arms by rivets. First and second rivet heads of the rivets are countersunk into the carrier arms on one face and into the sprocket on the other face. The second rivet head is formed on the sprocket on the front face of the sprocket carrier. To prevent the riveting tool from damaging the sprocket during the riveting process, the rivet holes of the sprockets include a clearance portion around the second rivet head. This clearance results in the sprocket having three-stepped rivet holes: a small diameter for the rivet shaft, an intermediate diameter for the rivet head and a larger diameter for the riveting tool. To minimize weight, the carrier arms narrow in a central region between radially inner and radially outer rivet holes on the carrier arms. The sprocket facilitates the maintenance of the riveted sprocket assembly. However, each carrier arm is substantially stair-shaped for attaching a plurality of sprockets and the thickness of the carrier arm increases from an end attaching a smallest sprocket to another end attaching a largest sprocket. Therefore, the increasing thickness entails substantially excess weight.

U.S. Pat. No. 7,344,463 shows a sprocket assembly that includes at least three sprockets and a sprocket carrier having a plurality of radially extending carrier arms. The carrier arms include a first receiving surface and a second receiving surface opposite the first receiving surface. A first sprocket is mounted to the first receiving surface, and a second sprocket is mounted to the second receiving surface. A third sprocket is arranged between the first and second sprockets. The first, second and third sprockets are directly mounted onto the sprocket carrier. Hence, each carrier arm still has a excess thickness delimited from the first sprocket to the second sprocket for supporting the first and second sprockets, and the excess thickness entails substantially excess weight.

The present invention is, therefore, intended to obviate or at least alleviate the problems encountered in the prior art.

SUMMARY OF THE INVENTION

According to the present invention, the main purpose is to provide a cogset, adapted to connect to a rotatable hub in a bicycle, comprising a first cog, a second cog connected to the first cog, and a support element installed to the second cog. A limiting side of the support element is abutted against a side of the second cog. The support element is mounted by the first cog. Each of the first and second cogs is not directly connected to the rotatable hub.

An advantage of the cogset according to the present invention is that the support element is fully mounted by the inner periphery of the first cog. Therefore, the support element has advantages of being light weight and easy to assemble.

Another advantage of the cogset according to the present invention is that the reinforcement portion is engaged with the engaging portion of the first cog and is adapted for sustaining more shear stress applied on the support element.

Another advantage of the cogset according to the present invention is that a diameter of the recess is larger than that of the flange, such that the flange is disposed in the recess, and such that the connector would not interfere with respect to the chain while operating.

A further advantage of the cogset according to the present invention is that each of the first and second cogs is not directly connected to the rotatable hub so that the diameter of the through hole of the first cog and the through hole of the second cog can be maximized to decrease the weight of the cogset.

Other advantages and features of the present invention will become apparent from the following description referring to the drawings.

All figures are drawn for ease of explanation of the basic teachings of the present invention only; the extensions of the Figures with respect to number, position, relationship, and dimensions of the parts to form the preferred embodiments will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE PREFERRED EMBODIMENTS

Referring to FIGS. 1 through 9, a cogset 1 in accordance with an embodiment of the present invention is adapted to connect to a rotatable hub in a bicycle. The cogset 1 comprises a first cog 10, a second cog 20 connected to the first cog 10, a support element 30 installed to the second cog 20, and at least one third cog 40 connected to the second cog 20. Specifically, each of the first, second, and third cogs 10, 20 and 40 includes a plurality of teeth formed around its outer peripheral edge to cooperate with a chain. Preferably, each of the first, second and third cogs 10, 20 and 40 has a radial distance, which is measured from a center thereof to an outer peripheral edge thereof and which differentiates from one another in order to accomplish different bicycle speeds. Preferably, the radial distance of the first cog 10 is larger than the radial distance of the second cog 20, and the radial distance of the second cog 20 is larger than the radial distance of any third cog 40.

The first cog 10 has two opposing sides including a first side 101 distal from the second cog 20, and a second side 102 adjacent to the second cog 20. The first cog 10 includes a through hole 11 extending from the first side 101 to the second side 102 and delimited by an inner periphery 111 thereof to decrease the weight of the first cog 10. The first cog 10 further includes an engaging portion 12 adjacent to the through hole 11 and protruded from the inner periphery 111.

The second cog 20 has two opposing sides including a first side 201 adjacent to the first cog 10, and a second side 202 distal from the first cog 10. The second cog 20 includes a through hole 21 extending from the first side 201 to the second side 202 and delimited by an inner periphery 211 thereof to decrease the weight of the second cog 20. The second cog 20 further includes a connecting portion 22 adjacent to the through hole 21 and protruded from the inner periphery 211. In addition, the connecting portion 22 has at least one aperture 23 extending therethrough. Preferably, the through hole 21 of the second cog 20 has a diameter smaller than that of the through hole 11 of the first cog 10.

In a preferred form, the cogset 1 comprises eight third cogs 40 including a smallest third cog 40 which has a positioning hole 41 extending therethrough, and a largest third cog 40 which is connected to the second side 202 of the second cog 20.

The cogset 1 comprises at least one pin A disposed between the first cog 10 and the second cog 20 and adapted to connect the first cog 10 and the second cog 20. The pin A is substantially column shaped and has a first portion A1 which has a first distance W1 along a longitudinal direction of the pin A. Both sides of the first portion A1 abut against the second side 102 of the first cog 10 and the first side 201 of the second cog 20, respectively. Therefore, the second side 102 of the first cog 10 and the first side 201 of the second cog 20 have a gap defined therebetween. Preferably, the gap is equivalent to the first distance W1.

The second cog 20 includes a connector 24 having two opposite ends including a first end 241 and a second end 242 distal from the first end 241. The first end 241 of the connector 24 is installed to the aperture 23 of the second cog 20. The second end 242 of the connector 24 has a diameter along a radial direction of the connector 24 larger than that of the first end 241 of the connector 24 and larger than that of the aperture 23 so that the connector 24 is prevented from moving toward the second side 202 of the second cog 20.

The support element 30 has two opposing sides including a first limiting side 301 distal from the first side 201 of the second cog 20, a second limiting side 302 adjacent to the first side 201 of the second cog 20, and an outer periphery 303 extending from the first limiting side 301 to the second limiting side 302. The support element 30 includes a supporting hole 31 extending from the first limiting side 301 to the second limiting side 302, an opening 32 corresponding to the aperture 23, and a reinforcement portion 33 formed on the outer periphery 303 thereof. Preferably, the reinforcement portion 33 is protruded from the outer periphery 303 of the support element 30 and corresponds to the engaging portion 12 of the first cog 10.

The first end 241 of the connector 24 has a flange 243 formed thereon distal from the second end 242. The flange 243 of the connector 24 has a diameter along a radial direction of the connector 24 larger than that of the aperture 23, such that the connector 24 would not move with respect to the second cog 20. The second side 202 of the second cog 20 has a recess 25 formed thereon and in communication with the aperture 23. In addition, a diameter of the recess 25 is larger than that of the flange 243, such that the flange 243 is disposed in the recess 25, and such that the connector 24 would not interfere with respect to the chain while operating.

The second limiting side 302 is abutted against the first side 201 of the second cog 20. Moreover, the outer periphery 303 of the support element 30 is mounted by the inner periphery 111 of the first cog 10. Preferably, a largest inner diameter of the inner periphery 111 of the first cog 11 is larger than a largest outer diameter of the outer periphery 303 of the support element 30 such that the support element 30 is fully mounted by the inner periphery 111 of the first cog 10. Therefore, the support element 30 has advantages of being light weight and easy to assemble. The opening 32 of the support element 30 is inserted by the second end 242 of the connector 24 to prevent the support element 30 from rotating with respect to the second cog 20.

Figure 1:
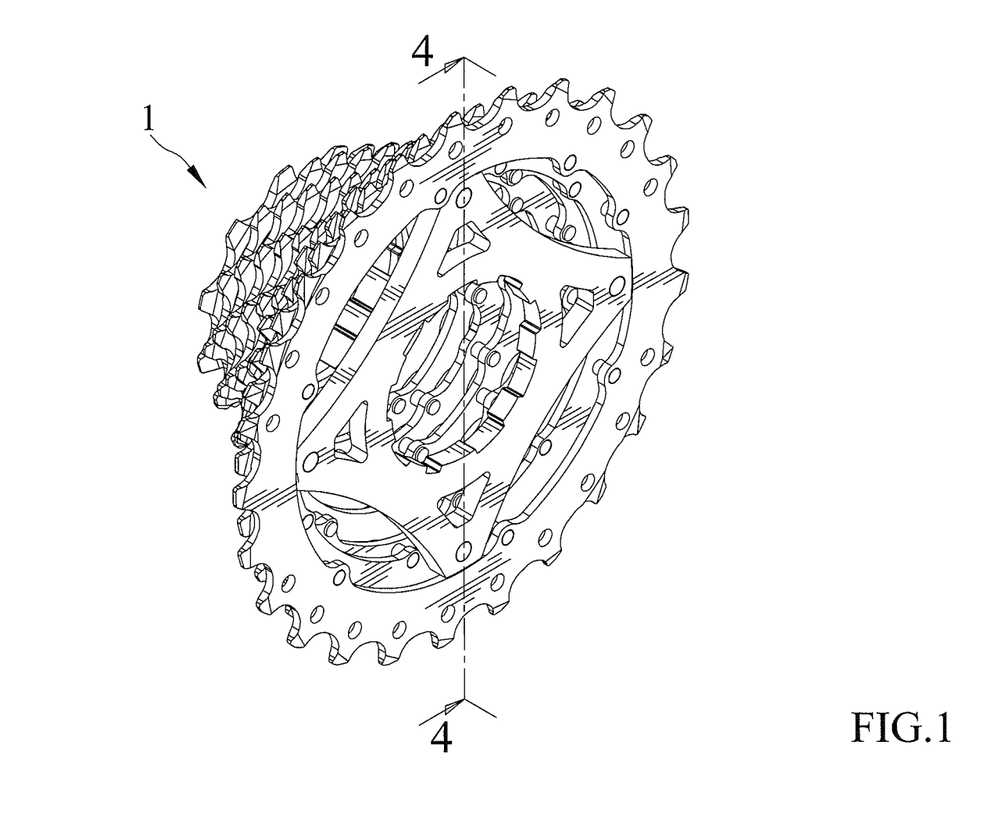
FIG. 1 is a perspective view of a cogset according to the present invention.
Figure 2:
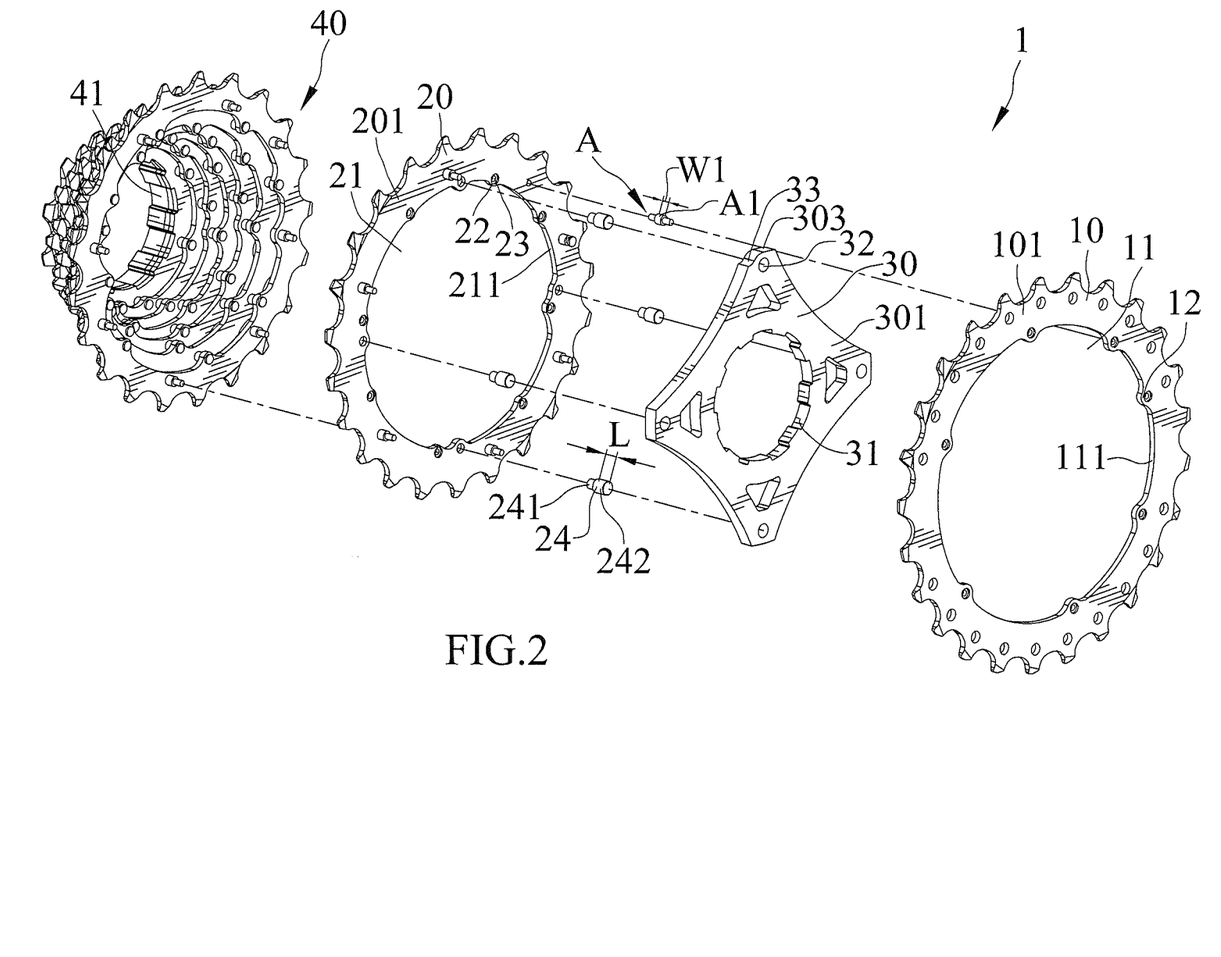
FIG. 2 is an exploded perspective view of the cogset of FIG. 1.
Figure 3:
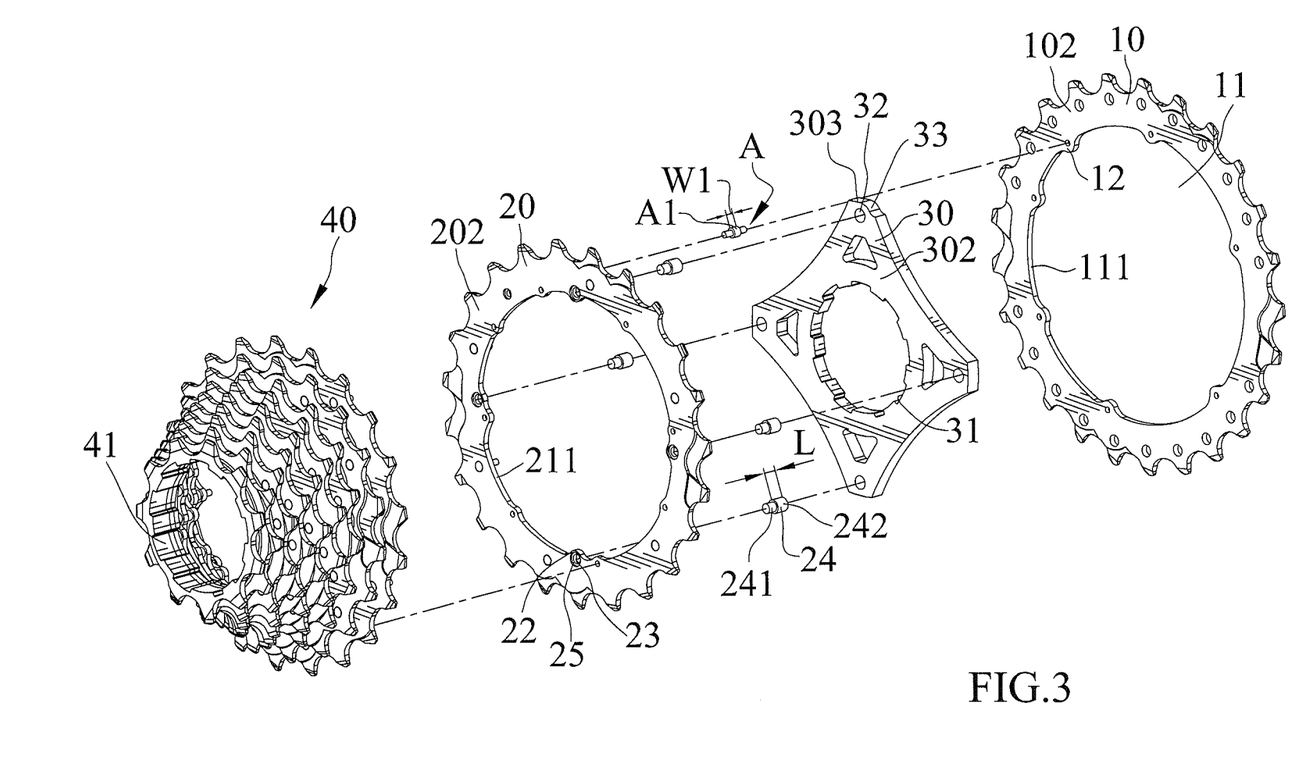
FIG. 3 is another exploded perspective view of the cogset of FIG. 1.
Figure 4:
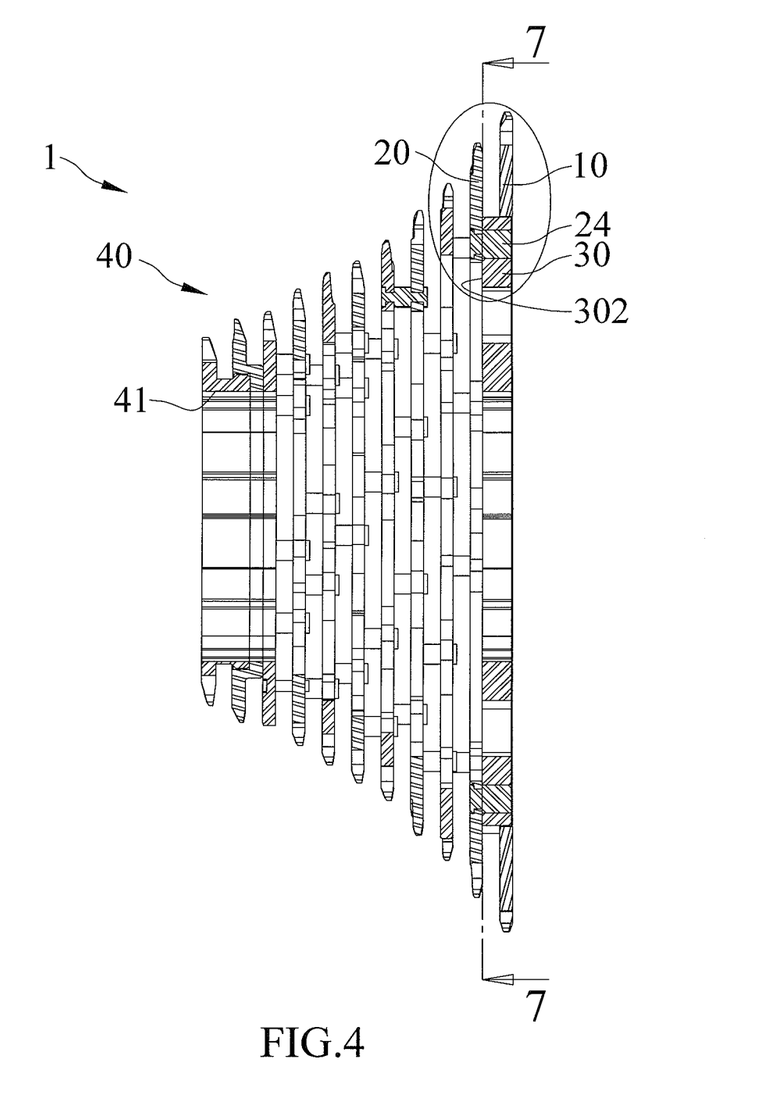
FIG. 4 is a cross-section view taken along line 4-4 of FIG. 1.
Figure 5:
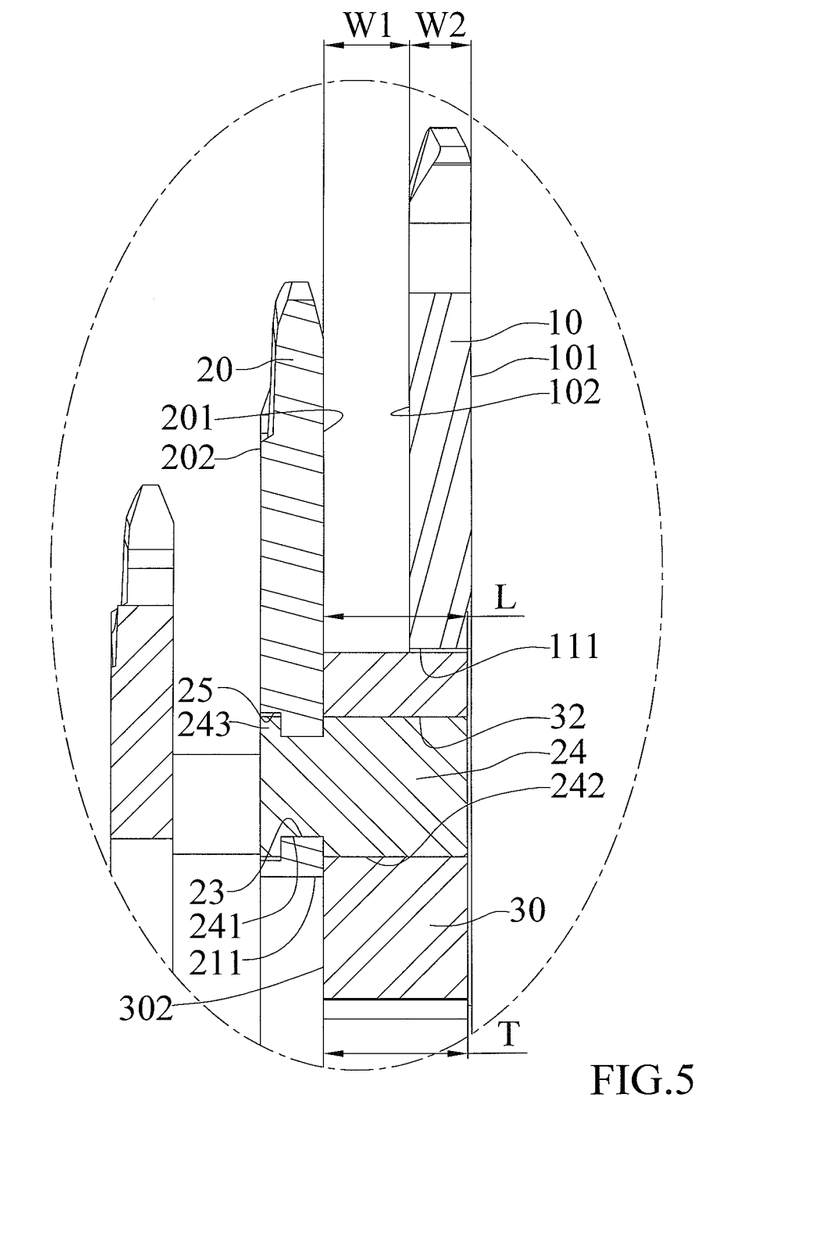
FIG. 5 is a partial, enlarged view of FIG. 4 and shows that a support element is not protruded from a first side of a first cog.
Figure 6:
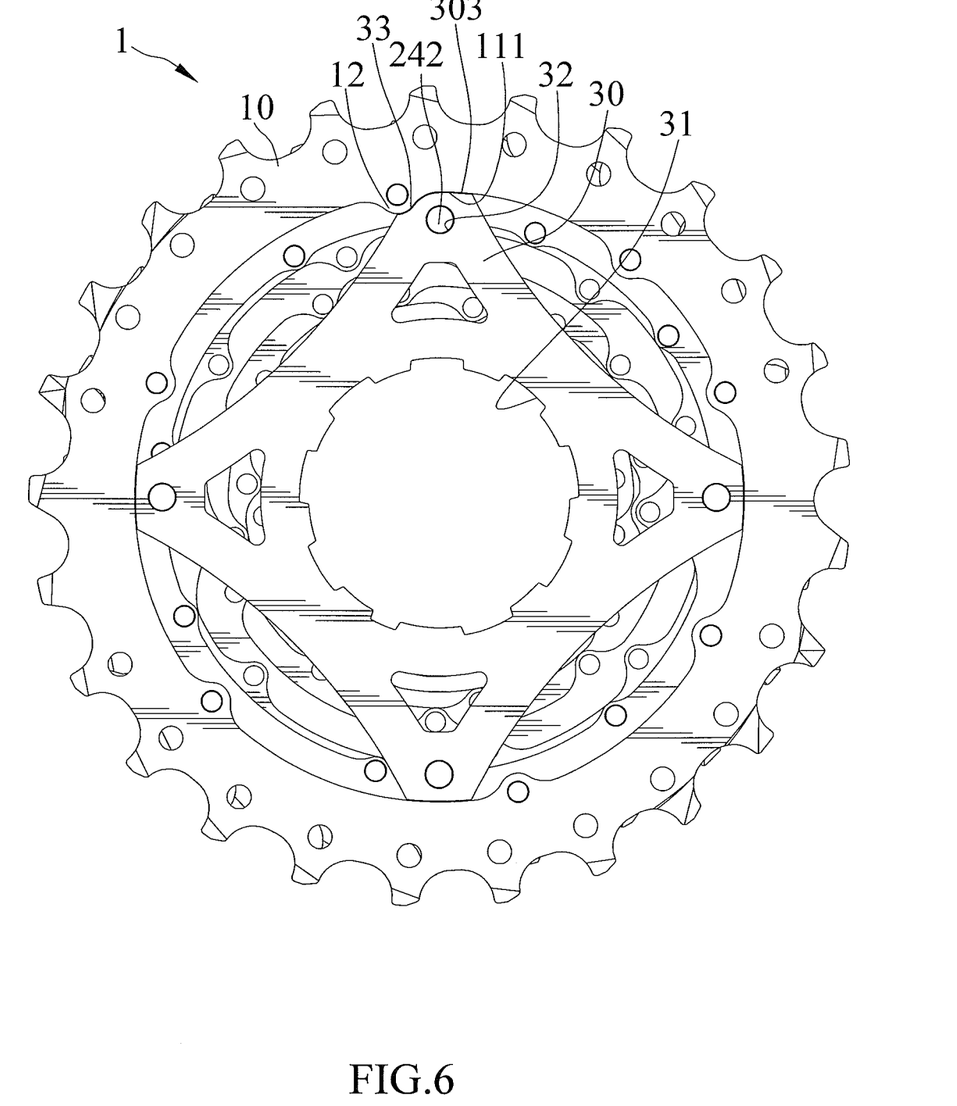
FIG. 6 is a front view of the cog set according to the present invention.
Figure 7:
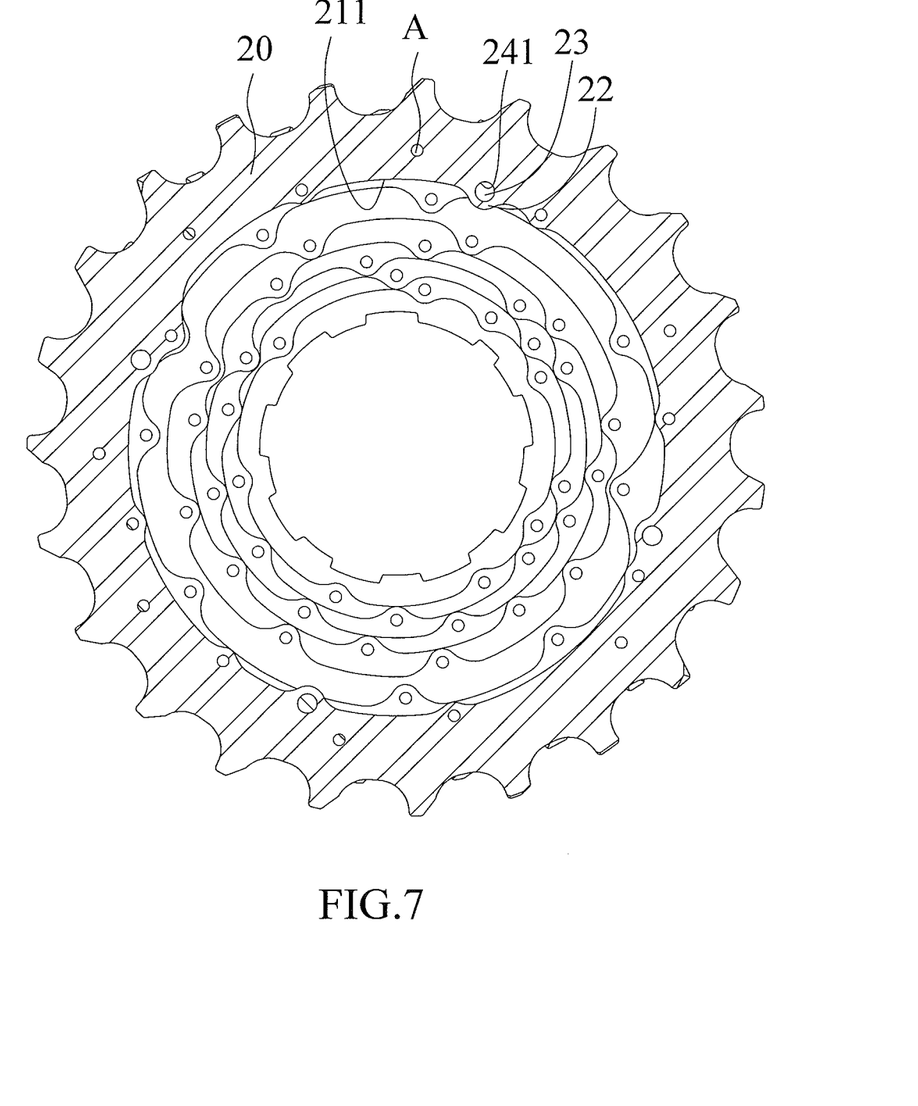
FIG. 7 is a cross-section view taken along line 7-7 of FIG. 4.
Figure 8:
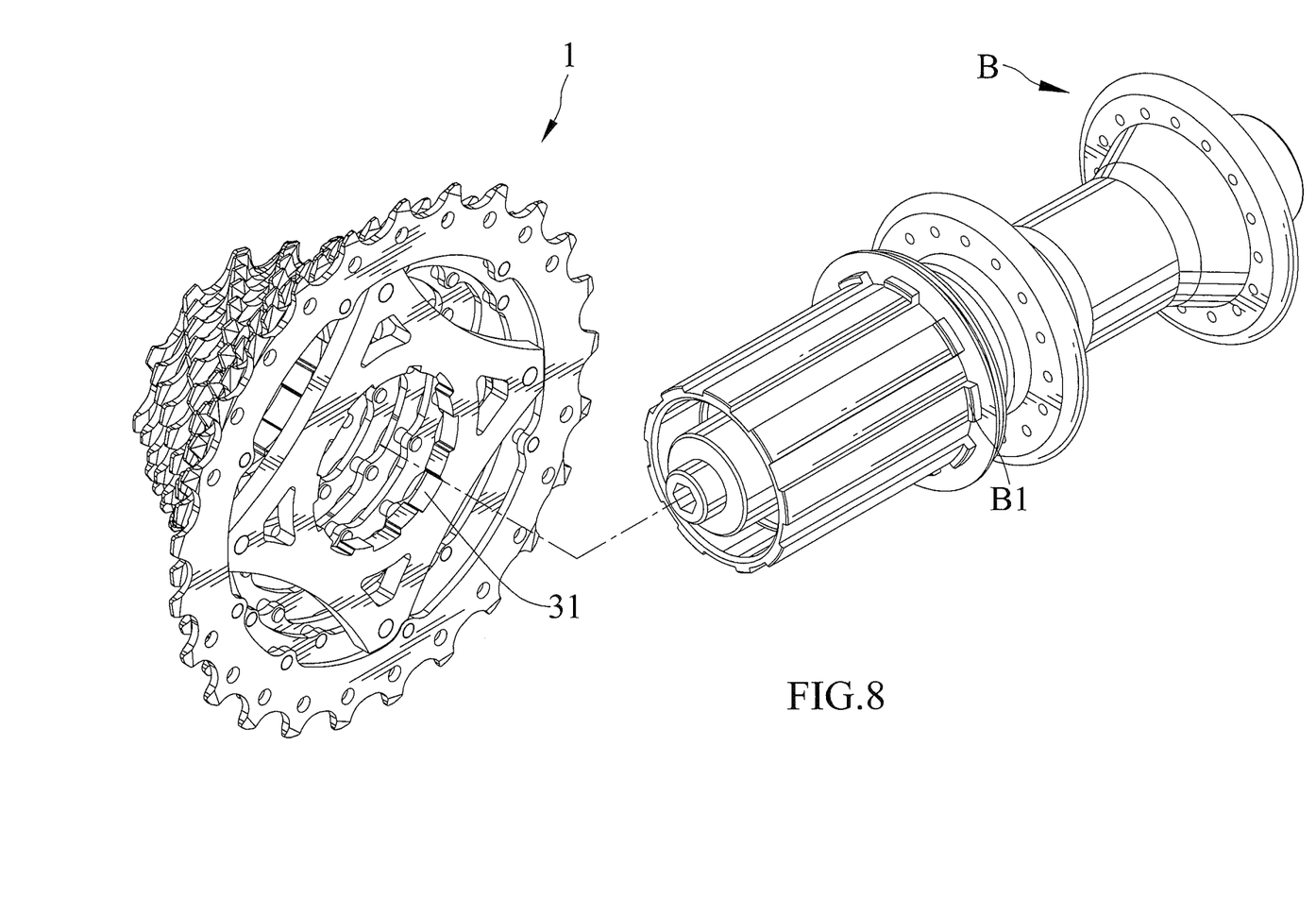
FIG. 8 shows the cogset is adapted to connect to a rotatable hub in a bicycle.
Figure 9:
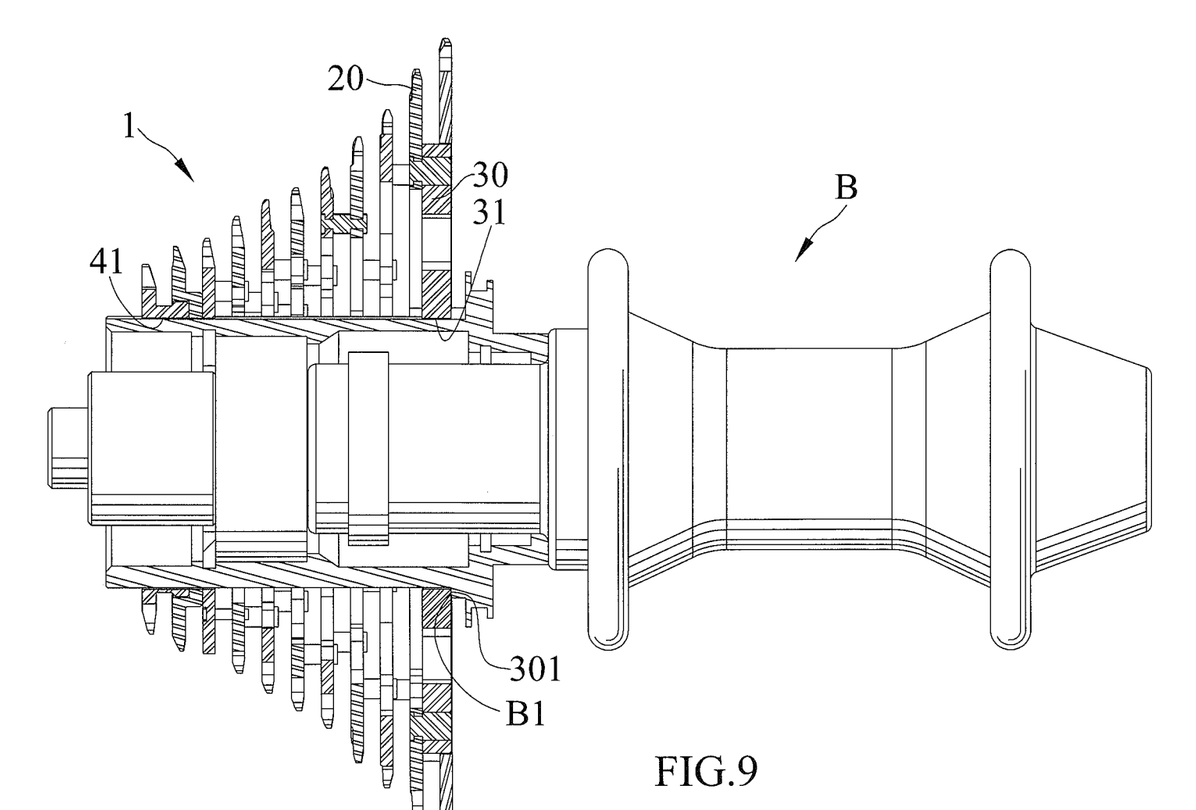
FIG. 9 shows the support element is retained by a second cog and the rotatable hub.

The first and second sides 101 and 102 of the first cog 10 have a second distance W2 defined therebetween, and the first and second limiting sides 301 and 302 of the support element 30 have a thickness T defined therebetween as shown in FIG. 5. The thickness T is not larger than the combination of the first distance W1 and the second distance W2, so that the first limiting side 301 of the support element 30 would not protrude from the first side 101 of the first cog 10 to prevent the support element 30 from interfering with respect to a frame of the bicycle while operating. The second end 242 of the connector 24 has a length L along a longitudinal direction of the connector 24, and the length L is not larger than the combination of the first distance W1 and the second distance W2, so that the second end 242 of the connector 24 would not protrude from the first side 101 of the first cog 10 to prevent the connector 24 from interfering with respect to the frame of the bicycle. The reinforcement portion 33 is engaged with the engaging portion 12 of the first cog 10 and is adapted for sustaining more shear stress applied on the support element 30. The first end 241 of the connector 24 has a cross-section the same as that of the aperture 23 of the second cog 20, and the second end 242 of the connector 24 has a cross-section the same as that of the opening 32 of the support element 30. Therefore, the support element 30 is steadily disposed between the first and second cogs 10 and 20.

The supporting hole 31 and the positioning hole 41 are adapted to connect to a rotatable hub B in a bicycle, and to cooperate with the rotatable hub B. The rotatable hub B includes a retaining portion B1 which is adapted to abut against the first limiting side 301 of the support element 30 to prevent the support element 30 from detaching from the second cog 20.

The first, second and third cogs 10, 20 and 40 are separately formed and are connected with each other by the connectives A. In addition, each of the first and second cogs 10 and 20 is not directly connected to the rotatable hub, so that the diameter of the through hole 11 and the through hole 21 can be maximized to decrease the weight of the cogset 1.

While the specific embodiments have been illustrated and described, numerous modifications come to mind without significantly departing from the spirit of invention, and the scope of invention is only limited by the scope of the accompanying claims.

What is claimed is:

1. A cogset adapted to connect to a rotatable hub in a bicycle, comprising:
   a first cog including two opposite sides and a first through hole extending between the two opposite sides and delimited by an inner periphery thereof to decrease weight of the first cog;

a second cog including a first side adjacent to the first cog, a second through hole extending therethrough to decrease weight of the second cog, a connecting portion adjacent to the second through hole, and a connector installed thereto, wherein the connecting portion has an aperture extending therethrough, with the connector having two opposing ends including a first end and a second end;

a support element installed to the second cog and including a first limiting side adjacent to the first cog, a second limiting side distal from the first cog and an outer periphery extending from the first limiting side to the second limiting side;

wherein the second limiting side is abutted against the first side of the second cog, wherein the outer periphery of the support element is mounted by the inner periphery of the first cog, wherein the support element has an opening corresponding to the aperture, wherein the first end of the connector is installed to the aperture of the second cog, wherein the opening of the support element is inserted by the second end of the connector to prevent the support element from rotating with respect to the second cog, wherein the first cog further includes an engaging portion adjacent to the first through hole, intermediate the two opposite sides, and protruded from the inner periphery, wherein the support element includes a reinforcement portion, and wherein the reinforcement portion is directly engaged with the engaging portion intermediate the two opposite sides of the first cog.

2. The cogset as claimed in claim 1, wherein the second cog includes a second side distal from the first cog, and wherein the second end of the connector has a diameter along a radial direction of the connector larger than that of the first end of the connector and larger than that of the aperture to prevent the connector moving toward the second side of the second cog.

3. The cogset as claimed in claim 2, wherein the first end of the connector has a flange formed thereon distal from the second end, and wherein the flange of the connector has a diameter along a radial direction of the connector larger than that of the aperture to prevent the connector not moving with respect to the second cog.

4. The cogset as claimed in claim 3, wherein the second side of the second cog has a recess formed thereon and in communication with the aperture, and wherein a diameter of the recess is larger than that of the flange to allow the flange to be disposed therein.

5. The cogset as claimed in claim 4, further comprising: a pin disposed between the engaging portion of the first cog and the second cog and outwardly of the support element.

6. The cogset as claimed in claim 5, wherein the pin has a first portion located intermediate opposite end portions, with the first portion having a first distance between the opposite end portions equal to a gap between the first and second cogs.

7. The cogset as claimed in claim 1 further comprising a third cog, with the second cog including a second side distal from the first cog, with the third cog connected to the second side of the second cog, and wherein the third cog has a positioning hole extending therethrough and adapted to connect to the rotatable hub.

8. The cogset as claimed in claim 1, wherein the two opposing sides includes a first side distal from the second cog and a second side adjacent to the second cog, wherein the second side of the first cog and the first side of the second cog have a first distance defined therebetween, wherein the first and second sides of the first cog have a second distance defined therebetween, wherein the first and second limiting sides of the support element have a thickness defined therebetween, and wherein the thickness is not larger than a combination of the first distance and the second distance.

9. The cogset as claimed in claim 1, wherein the two opposing sides includes a first side distal from the second cog and a second side adjacent to the second cog, wherein the second side of the first cog and the first side of the second cog have a first distance defined therebetween, wherein the first and second sides of the first cog have a second distance defined therebetween, wherein the second end of the connector has a length along a longitudinal direction of the connector, and wherein the length is not larger than a combination of the first distance and the second distance.

10. The cogset as claimed in claim 1, wherein a largest inner diameter of the inner periphery of the first cog is larger than a largest outer diameter of the outer periphery of the support element.

11. The cogset as claimed in claim 1, further comprising a plurality of third cogs including a largest third cog and a smallest third cog, with the smallest third cog having a positioning hole extending therethrough and adapted to connect to the rotatable hub, and with the largest third cog connected to the second cog.

12. The cogset as claimed in claim 1, further comprising: a pin disposed between the first cog and the second cog and outwardly of the support element.

13. The cogset as claimed in claim 12, wherein the pin has a first portion located intermediate opposite end portions, with the first portion having a first distance between the opposite end portions equal to a gap between the first and second cogs.

14. The cogset as claimed in claim 1 further comprising at least one pin disposed between the first cog and the second cog and adapted to connect the first cog and the second cog.

15. The cogset as claimed in claim 1, wherein the pin is column shaped and has a first portion which has a first distance along a longitudinal direction of the pin.

16. A cogset adapted to connect to a rotatable hub in a bicycle, comprising:
a first cog including two opposite sides and a first through hole extending between the two opposite sides and delimited by an inner periphery thereof to decrease weight of the first cog;
a second cog including a first side adjacent to the first cog, a second through hole extending therethrough to decrease weight of the second cog, a connecting portion adjacent to the second through hole, and a connector installed thereto, wherein the connecting portion has an aperture extending therethrough, with the connector having two opposing ends including a first end and a second end;
a support element installed to the second cog and including a first limiting side adjacent to the first cog, a second limiting side distal from the first cog and an outer periphery extending from the first limiting side to the second limiting side;
wherein the second limiting side is abutted against the first side of the second cog, wherein the outer periphery of the support element is mounted by the inner periphery of the first cog, wherein the support element has an opening corresponding to the aperture, wherein the first end of the connector is installed to the aperture of the second cog, wherein the opening of the support element is inserted by the second end of the connector to prevent the support element from rotating with respect to the second cog, wherein the first cog further includes an engaging portion adjacent to the first through hole, intermediate the two opposite sides, and protruded inward from the inner periphery, wherein the support element includes a reinforcement portion, and wherein the reinforcement portion is directly engaged with the engaging portion intermediate the two opposite sides of the first cog.

* * * * *